United States Patent [19]
Vlach

[11] 3,796,852
[45] Mar. 12, 1974

[54] ELECTRICAL DISCHARGE MACHINING TOOL

[76] Inventor: Donald A. Vlach, 4446 N. 36th St., Apt. 30, Phoenix, Ariz. 85018

[22] Filed: Dec. 6, 1971

[21] Appl. No.: 205,199

[52] U.S. Cl. .............................. 219/69 E, 29/25.17
[51] Int. Cl. ............................................... B23k 9/16
[58] Field of Search ........ 219/69 E, 69 D, 69 V, 69; 29/25.17; 306/34

[56] References Cited
UNITED STATES PATENTS

| 521,861 | 6/1894 | Zeiser et al. | 306/34 |
|---|---|---|---|
| 3,257,306 | 6/1966 | Webb | 219/69 G X |
| 3,322,185 | 5/1967 | Christenson | 29/25.17 X |
| 3,334,210 | 8/1967 | Williams et al. | 219/69 D |
| 3,513,282 | 5/1970 | Fox | 219/69 E |
| 2,427,588 | 9/1947 | Burnett | 219/69 E |
| 2,818,490 | 12/1957 | Dixon et al. | 219/69 E |

Primary Examiner—J. V. Truhe
Assistant Examiner—Hugh D. Jaeger
Attorney, Agent, or Firm—Cahill, Sutton & Thomas

[57] ABSTRACT

A method and apparatus are disclosed for machining a cavity within a work piece by electrical discharge machining with a tool having a replaceable electrode tip. The tool includes a positioning member, a holder, a stem attached to the holder, and a tip secured to the stem. The tool is aligned with the work piece wherein the cavity is to be formed and movable toward and away from the work piece without affecting the alignment. During the electrical discharge machining, which produces the cavity, the tip erodes and becomes worn, necessitating replacement. When the tip has become worn, the stem and holder are moved away from the work piece to permit replacement of the worn tip with a new tip. While the tip is being replaced, the alignment of the stem with respect to the work piece is unaffected and the new tip will be automatically aligned with the partial cavity already machined. The tool with the new tip is moved toward the work piece and the electrical discharge machining may be resumed.

5 Claims, 5 Drawing Figures

ELECTRICAL DISCHARGE MACHINING TOOL

The present invention relates to electrical discharge machining tools.

Electrical discharge machining may be described as a machining process wherein a pulsating DC current is passed through a dielectric medium between an electrode and the work piece. The electrical discharge occurring between the electrode and the work piece causes the part of the work piece adjacent the electrode to melt or vaporize. The rate of melting or vaporization is a function of the nature and hardness of the material of the work piece. Concurrently, there is also a melting or vaporization of the electrode, generally termed as "wear" of the electrode. The wear of the electrode is generally not uniform over its surface due to the varying current density of the electrical discharge. This uneven wear necessarily causes the electrode to alter its shape to that of a smooth surfaced cylinder. The cavity obtained in the work piece due to the electrical discharge is a replica of the shape of the electrode. For this reason, the electrode, changing shape due to wear, must be periodically replaced in order that the cavity produced in the work piece remain the desired shape and configuration.

In the presently known apparatus for electrical discharge machining, the electrode consists of a relatively long (five to eight inches) electrode shaped to the shape of the cavity desired within the work piece. One end of the electrode is secured within a holder. The holder in turn is secured to a brace or other means whereby the alignment between the electrode and the work piece may be established. As the other end of the electrode, operating upon the work piece, becomes worn the electrode and the holder must be physically displaced from the work piece to permit the electrode to be disengaged from the holder. On disengagement of the electrode, the worn end must be dressed or severed from the remaining portion of the electrode, or the complete electrode may be replaced. When the electrode is replaced within the holder, the electrode must necessarily be realigned with the partial cavity in the work piece. The criticality of the process of realigning the electrode with the cavity is dependent upon the tolerances required in the cavity. Where close tolerances are mandatory, the realignment process is tedious and time-consuming.

The rapidity of wear of the electrode is a function of the electrode material, the work piece material, and the current passed therebetween. The part of the electrode adjacent the work piece and the work piece are generally immersed in a dielectric of some type. The purpose for using a dielectric is twofold. First, the dielectric becomes ionized at a predeterminable power level to permit an electrical discharge between the electrode and the work piece. Secondly, the dielectric, if agitated or flushed between the electrode and the work piece, provides a facile method of washing away the particles of material removed from both the work piece and the electrode.

In the prior art devices, the rate of work piece material removal was generally proportional to the rate of wear. In practice, an increased rate of material removal did in fact speed up that aspect of the machining operation; however, the increased wear rate of the electrode required a more frequent dressing and/or replacement of the electrodes. As mentioned above, the technique presently available for replacing the worn electrodes is extremely time-consuming due to the requirements for near exact realignment of the electrode. The beneficial effect of employing a faster mterial removal rate was to a great extent nullified by the time required to replace a larger number of electrodes.

It is therefore a primary object of the present invention to provide an easily replaceable electrode tip for an electrical discharge machining tool.

Another object of the present invention is to provide a replaceable electrode tip which does not require realignment of the electrode with the work piece.

Another object of the present invention is to obviate all realignment requirements subsequent to an initial alignment between the electrical discharge machining tool and the work piece.

Another object of the present invention is to reduce the waste of the unuseable electrode.

Another object of the present invention is to provide a replaceable electrode tip which may be secured by hand to the electrode.

Another object of the present invention is to preserve the capability of flushing the electrode and work piece with a dielectric medium.

Another object of the present invention is to provide a capability for reusing the worn tips for rough cut work and reuseable for smaller cavities.

These and other objects of the present invention will become apparent to those skilled in the art as the description thereof proceeds.

The present invention teaches a method and the apparatus for machining a work piece by electrical discharge machining with a tool having a replaceable tip. The tool includes a positioning member, a holder connected to the positioning member, a stem attached to the holder, and a replaceable tip secured to the stem. The tip has an outside configuration equivalent to the shape of the cavity to be formed. A cavity extends through the central part of the tip and receives a split extension located at the extremity of the stem. A right angle shoulder of the stem axially positions the tip with respect to the stem. A tapered set screw axially aligned with the tip fits within the central portion of the tip and engages the split extension forcing the elements of the split extension outwardly. By this manner, the tip may be frictionally secured to the extremity of the stem. The function of the positioning member is that of axially displacing the tip with respect to the work piece. The holder in combination with the stem are aligned with respect to the cavity to be formed in the work piece. The tip at the extremity of the stem acts as a discharge point between the tool and the work piece for the electrical arc of the electrical discharge machining. In operation, the tool is aligned with the work piece and moved toward the work piece to effect the electrical discharge machining. During the electrical discharge machining producing a cavity in the work piece, the tip erodes and becomes worn, necessitating replacement of the tip. To replace the worn tip, the stem, holder and positioning member are axially displaced from the work piece to permit the tip to be replaced. The new tip is moved toward the work piece and the machining operation may be resumed. While the tip is being replaced, the alignment of the stem with respect to the work piece is unaffected and the new tip will be automatically aligned with the partial cavity already machined.

The present invention may be described with more specificity and clarity with reference to the following figures, in which.

Figure 1:
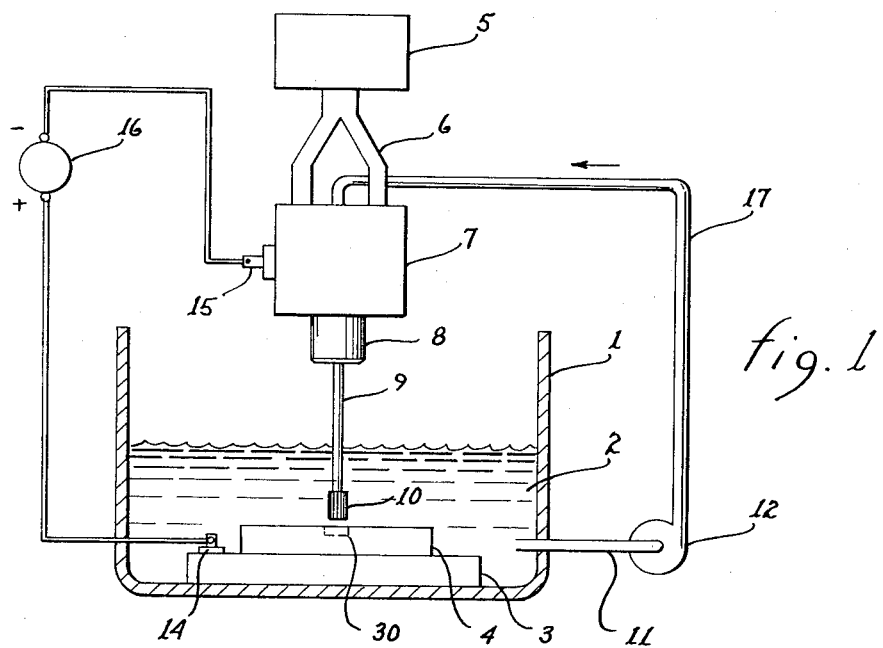
FIG. 1 illustrates device incorporating the teachings of the present invention.

Referring to FIG. 1, there is shown a simplified diagram of the electrical machining process. A container 1 containing a shallow bath of dielectric fluid 2 provides the environment within which the electrical discharge machining is performed. The container 1 may include a pedestal 3 for mounting a work piece 4 thereon. Although not shown, the pedestal 3 includes appropriate and necessary alignment members and positioners for properly orienting the work piece 4. A positioning member, which includes feed control system 5, supports 6, and support member 7, is suspended above the work piece 4. Supports 6 extend from the feed control system 5 and attached support member 7 thereto. A holder 8, connected to support member 7, has a stem 9 attached thereto. A tip 10 is secured to stem 9. In operation, the feed control system 5, operating through the above-mentioned elements, axially displaces tip 10 in an axis parallel to and aligned with the axis of the cavity to be machined within work piece 4.

A stem 9, including a replaceable tip 10 (shown in further detail in FIGS. 2 and 3), is secured to holder 8. Holder 8 may be secured to support member 7 in such a manner that the holder 8, in combination with stem 9, may be positioned in the horizontal plane relative to support member 7 to align the tip 10 with the portion (shown as cavity 30) of work piece 4 to be worked. In the alternative, holder 8 may be rigidly attached to support member 7 and support member 7 may be positioned in the horizontal plane relative to feed control system 5 in align tip 10 with the appropriate point on the work piece 4. As a further alternative, feed control system 5, the support member 7, holder 8, and stem 9 may be immovable in the horizontal plane relative to one another, and the work piece 4 may be positionable in the horizontal plane to effect correct alignment between the tip 10 and the cavity 30 to be formed in the work piece 4.

Regardless of which of the above-enumerated arrangements are used to align tip 10 with the work piece 4 in the horizontal plane, subsequent axial displacement of tip 10 will not affect the horizontal alignment.

The inclusion of a dielectric medium 2 disposed between the tip 10 and work piece 4 serves two major functions. First, it provides an ionizable medium whereby an electrical discharge may be effected between the tip 10 and the work piece 4. This electrical discharge melts or vaporizes the respective point on the work piece 4 and thereby removes a portion of the work piece 4. Secondly, the dielectric medium 2, if agitated, will flush the work area of the work piece 4 to prevent a build up of material removed from the work piece 4. There are several methods for flushing the work area of the work piece 4. One of the more effective methods is that of discharging the dielectric fluid 2 through the central portion of the tip 10. In this manner, the discharged dielectric fluid 2 immediately strikes and flows about the cavity 30 and effectively flushes the cavity 30 of the removed particles. This operation necessitates that the tip 10 as well as stem 9, holder 8, and support member 7 include a cavity 13 extending therethrough. To effect a flow of dielectric fluid 2 through cavity 13, a pump 12 may be used. The pump 12, as shown, picks up the dielectric fluid 2 from the lower portion of container 1 through pipe 11 and discharges the fluid through pipe 17 into the upper part of support member 7. Pipe 17 is connected to the extremity of cavity 13. In this manner, a flow path for a dielectric fluid 2 may be established.

Source 16 represents a pulsating direct current source. The negative terminal of source 16 is connected to terminal 15 positioned on support member 7. Although not shown, it is assumed that terminal 15 is electrically connected to tip 10. The positive terminal of source 16 is connected to terminal 14 positioned on pedestal 3. Although not shown, it is again assumed that terminal 14 is electrically connected to the work piece 4. When an arc occurs between tip 10 and work piece 4, the electrical path between the terminals of source 16 is completed.

Source 16 may include adjustments for both the pulse rate and current amplitude. It has been found that for any given current level, the pulse rate is proportionally determinative of the surface smoothness or fineness with which the resulting cavity 30 is being formed. For any given pulse rate, the current level is proportionally determinative of the amount of material removed. In this manner, by varying both the current and the pulse rate, the amount of material to be removed within a given time period may be varied for any given degree of fineness of the resulting cavity 30. Or, conversely, the degree of fineness of the resulting cavity 30 may be varied by the frequency of the pulses for any given rate of material removal.

The size of the cavity 30 to be machined is primarily controlled by the size of the tip 10 being used. For any given sized tip 10, the resulting cavity 30 will be somewhat larger in cross section than the actual tip 10 due to the electronic envelope surrounding the tip 10. The electronic envelope may be defined as the clearance between the tip 10 and the surface of the cavity 30. The amount of the clearance is directly proportional to the current level being used. It should also be noted that the clearance extends from any given point on the tip 10 through an arc from one side of that point to the other side. This phenomena necessarily precludes the cavity 30 from having as sharp an angular configuration as the corresponding angular configuration of tip 10. In further explanation, it may be said that the sharpest corner that may be obtained within the cavity 30 is that of a rounded corner having a radius equivalent to the clearance distance. In practice, the clearance may vary from 0.0006 – 0.0045 inches, depending on the current level. By using charts and other information of tip size and clearance figures, it is possible to obtain a cavity tolerance of 0.0001 inches.

Figure 2:
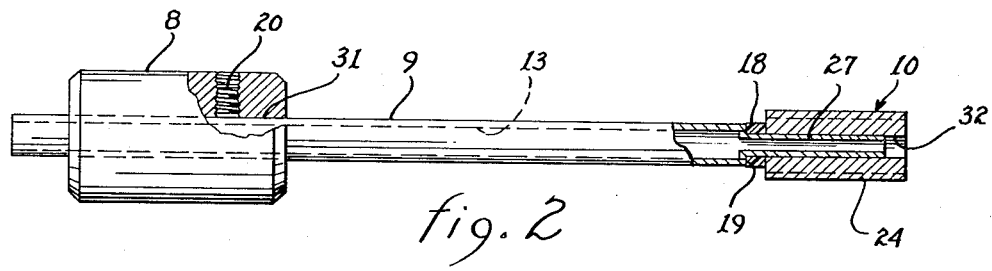
FIG. 2 illustrates the positioning relationship of the replaceable tip, the stem, and the holding member.
Figure 3:
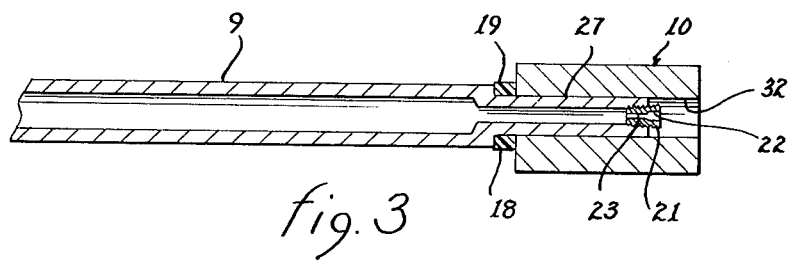
FIG. 3 illustrates a cross section of the replaceable tip and the stem.

Referring to FIGS. 2 and 3, there are shown more detailed views of the stem 9 and tip 10. In FIG. 2, the stem 9 is shown as inserted within a hollow central portion of holder 8. A set screw 20 secures stem 9 to holder 8 and prevents relative movement therebetween. The extremity of stem 9 includes a shoulder 19 and a split extension 27. A replaceable tip 10, shown as having axial ribs 24 therealong, has a hollow central portion 32 for receiving split extension 27. The purpose of the shoulder 19 for cooperating with tip 10 is to provide a firm seat whereby on replacing tip 10 the replacement can be accurately axially displaced on stem 9 without a further calibration in terms of its axial alignment. Also, when the hole to be placed in the work piece does not extend entirely through the work piece, the shoulder provides a reference surface to insure the proper depth when a new tip is mounted on the stem. In many applications, it has been found that arcing sometimes occured between shoulder 19 and tip 10 due to the minor imperfections in smoothness between the two adjacent surfaces. In order to avoid the arcing between stem 9 and tip 10, a small machined annular dielectric washer 18 is positioned between shoulder 19 and tip 10. Washer 18 is constructed of relatively incompressible material. The tip 10, when fitted on split extension 27 and snugly positioned against the washer 18 and shoulder 19 was within a given tolerance of axial displacement each and every time.

Depending upon the resiliency of split extension 27, additional means might or might not be needed to secure tip 10 thereto, without having rotation or movement therebetween. FIG. 3 illustrates a cross section of stem 9 and tip 10. The relationships between stem 9, shoulder 19, insulator 18 and tip 10 are the same as those described with reference to FIG. 2. In addition, FIG. 3 illustrates a method for securing tip 10 to split extension 27. A tapered set screw 21 threadedly fits within the split extension 27. In operation, the tip 10 would be manually mounted on split extension 27. After tip 10 is snugly positioned against insulator 18, the tapered set screw 21 would be turned, such as with an Allen head wrench fitting within the cavity 22, forcing the tapered set screw 21 into the split extension 27 and concurrently forcing the elements of split extension 27 to extend laterally. The lateral extension of the elements of split extension 27 would bear against the sides of the central portion 32 of tip 10 and firmly secure tip 10 to split extension 27.

It is conceivable that other means may be used to secure tip 10 to the extremity of stem 9. For example, another means could be that of threadedly securing the tip 10 to split extension 27, but this method would also require additional machining of tip 10.

In order to provide a path for flushing cavity with dielectric fluid 2, stem 9 is shown as including an axial cavity 13. Necessarily, the tapered set screw 21 must also include a cavity 23 therethrough and central portion 32 must extend through tip 10. In this manner, cavity 30 may be flushed with dielectric fluid 2 flowing out of tip 10.

Figure 4A:
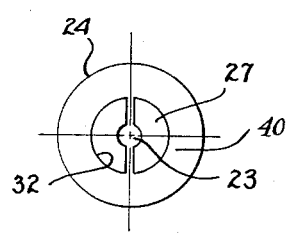
FIGS. 4a and 4b illustrate cross-sectional views of replaceable tips.
Figure 4B:
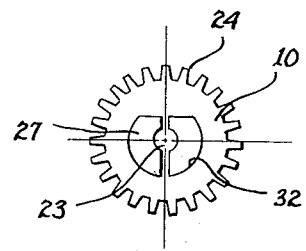

FIGS. 4a and 4b illustrate a cross section of two tips 40 and 10, each fitted on split extension 27 and having differently configured central portions 32. In the embodiment shown in FIG. 4a, the split extension 27 is shown as having two semi-circular elements while in FIG. 4b the cross section of a tip 10 is mounted on split extension 27, where split extension 27 is not circular. The tip 40 of FIG. 4a is used primarily for circular cavities while the tip 10 of FIG. 4b is used primarily for cavities requiring orientation. Portions of each of the elements of split extension 27 (shown in FIG. 4b) are truncated or flattened whereby they have what is known in the industry as a "Dee-section". The central portion 32 of tip 10 is shown as approximately duplicating the cross-sectional configuration of split extension 27. By this method, it is possible to key the tip 10 to the split extension 27 and stem 9 so that the ribs 24 of the replacement tip 10 will always be aligned with the corresponding indentations in cavity 30 of the work piece 4. The outer surface of the tip 10 in FIG. 4b is shown as a plurality of ribs 24 corresponding to the corrugations 24 shown in FIG. 2.

I claim:

1. An electrical discharge machining tool, including a holder and a stem connected to and extending from said holder, for machining a cavity within a workpiece, said electrical discharge machining tool comprising in combination:
   means for aligning said stem with the workpiece and with said cavity to be machined;
   an electrode tip, having a hollow portion for receiving the extremity of said stem, for machining said cavity;
   said stem including a split extension extending into said hollow portion;
   an annular shoulder positioned in proximity to said split extension for forming an axially abuttable surface to engage and position said electrode tip;
   means for spreading said split extension into engagement with said hollow portion for securing said tip to said stem;
   an insulator ring disposed in abutment to said annular shoulder and separating said annular shoulder from said electrode tip;
   means for axially positioning said stem and said electrode tip within and without the workpiece; and
   mounting means maintaining alignment and removably securing said electrode tip to said stem, whereby said electrode tip may be replaced during the machining of said cavity without further realignment between said tool and workpiece.

2. An electrical discharge machining tool, including a holder and a stem connected to and extending from said holder, for machining a cavity within a workpiece, said electrical discharge machining tool comprising in combination:
   means for aligning said stem with the workpiece and with said cavity to be machined;
   an electrode tip, having a hollow portion for receiving the extremity of said stem, for machining said cavity;
   said stem including a split extension extending into said hollow portion;
   an annular shoulder positioned in proximity to said split extension for forming an axially abuttable surface to engage and position said electrode tip, said shoulder axially positioning said electrode tip with respect to said stem;
   an annular insulator disposed between said shoulder and said electrode tip;
   means for axially positioning said stem and said electrode tip within and without the workpiece; and
   mounting means maintaining alignment and removably securing said electrode tip to said stem, whereby said electrode tip may be replaced during the machining of said cavity without further realignment between said tool and workpiece.

3. An electrical discharge machining tool for machining a cavity within a work piece and having a holder and a stem, said holder engaging one end of said stem, said tool comprising in combination:

means for orienting said stem with said cavity to be machined in the work piece;

means for axially positioning said stem with respect to the work piece;

a replaceable electrode tip removably attached to another end of said stem;

a hollow portion disposed within said electrode tip for receiving said other end of said stem and rotationally positioning said electrode tip with respect to said stem;

stop means for axially mounting said electrode tip on said other end of said stem in a predetermined axial relationship, said other end of said stem including a split extension positionable within said hollow portion; and means for spreading said split extension to effect contact between said split extension and the surface of said hollow portion; where by, said electrode tip is replaceable during the machining of said cavity without further rotational or lateral alignment between said stem and the work piece.

4. The combination set forth in claim 3, wherein said split extension is internally threaded and said spreading means comprises a screw engaging the internal threads of said split extension.

5. An electrical discharge machining tool for machining a cavity within a work piece and having a holder and a stem, said holder engaging one end of said stem, said tool comprising in combination:

means for orienting said stem with said cavity to be machined in the work piece;

means for axially positioning said stem with respect to the work piece;

a replaceable electrode tip, removably attached to another end of said stem;

attachment means associated with said stem and said electrode tip for rotationally positioning said electrode tip with respect to said stem; and an annular shoulder disposed about said stem, said shoulder limiting the axial movement of said electrode tip toward said holder; whereby, said electrode tip is replaceable during the machining of said cavity without further rotational or lateral alignment between said stem and the work piece.

* * * * *